US012618541B2

(12) United States Patent
Hartenstein

(10) Patent No.: US 12,618,541 B2
(45) Date of Patent: May 5, 2026

(54) APPARATUS FOR DEFROSTING A VEHICLE LIGHT

(71) Applicant: AAC Enterprises LLC, Metairie, LA (US)

(72) Inventor: Justin Hartenstein, Metairie, LA (US)

(73) Assignee: AAC Enterprises LLC, Metairie, LA (US)

( * ) Notice: Subject to any disclaimer, the term of this patent is extended or adjusted under 35 U.S.C. 154(b) by 1103 days.

(21) Appl. No.: 17/645,807

(22) Filed: Dec. 23, 2021

(65) Prior Publication Data

US 2022/0221126 A1 Jul. 14, 2022

Related U.S. Application Data

(60) Provisional application No. 63/135,852, filed on Jan. 11, 2021.

(51) Int. Cl.
| | |
|---|---|
| *F21S 45/60* | (2018.01) |
| *B60Q 1/00* | (2006.01) |
| *H05B 1/02* | (2006.01) |
| *H05B 3/06* | (2006.01) |
| *H05B 3/84* | (2006.01) |

(52) U.S. Cl.
CPC ............ *F21S 45/60* (2018.01); *B60Q 1/0023* (2013.01); *H05B 1/0236* (2013.01); *H05B 3/06* (2013.01); *H05B 3/84* (2013.01)

(58) Field of Classification Search
CPC .. B60Q 1/0005; B60Q 1/0017; B60Q 1/0023; B60Q 2900/10; F21S 45/60; H05B 1/0236; H05B 3/06; H05B 3/84
See application file for complete search history.

(56) References Cited

U.S. PATENT DOCUMENTS

| | | | | |
|---|---|---|---|---|
| 11,066,047 B1* | 7/2021 | Keller | ...................... | H05B 3/84 |
| 2007/0181565 A1* | 8/2007 | Murahashi | ............... | H05B 3/86 |
| | | | | 219/629 |
| 2018/0194271 A1* | 7/2018 | Eboli, Jr. | ................ | F21S 45/10 |
| 2018/0245767 A1 | 8/2018 | Lle | | |
| 2020/0340660 A1* | 10/2020 | Van Straten | ............ | G01S 13/86 |

OTHER PUBLICATIONS

Merriam-Webster. (n.d.). Frame definition & meaning Merriam-Webster. https://www.merriam-webster.com/dictionary/frame (Year: 2025).*

* cited by examiner

*Primary Examiner* — Ibrahime A Abraham
*Assistant Examiner* — Joe E Mills, Jr.
(74) *Attorney, Agent, or Firm* — Sisson & Banyas, Attorneys at Law, LLC; Jeffrey J. Banyas

(57) ABSTRACT

An apparatus for defrosting a vehicle light comprises a frame, a heating element connected to at least a portion of an internal facing surface of the frame, an attachment mechanism, and an electrical communication connection electrically connected between the heating element and a power source. The heating element may be configured to generate heat in the direction of the vehicle light, thereby melting snow, ice, or frost buildup on or in the vehicle light.

19 Claims, 7 Drawing Sheets

APPARATUS FOR DEFROSTING A VEHICLE LIGHT

CROSS REFERENCES AND PRIORITIES

This application claims priority from U.S. Provisional Application No. 63/135,852 filed on 11 Jan. 2021, the teachings of which are incorporated by reference herein in their entirety.

BACKGROUND

Frost, ice, snow, and moisture on or within a vehicle lighting assembly poses a particular problem for vehicle drivers—especially those living in cold-weather climates. For example, frost, ice, and snow buildup on top of or inside the lens of a headlight can be particularly dangerous as it can block or diffuse light emitted from the headlight resulting in the vehicle driver having difficulty seeing the road in front of them at night.

A number of solutions are commonly used in vehicles for removing frost, ice, snow, and moisture. The simplest of these apply to the vehicle's front and rear windshields, and commonly involve the use of a forced air heater which applies hot air to an interior surface of the window (typically seen for vehicle front windshields) or a series of heating elements applied to or embedded in the window (typically seen for vehicle rear windshields).

Solutions for removing frost, ice, snow, and moisture from a vehicle lighting assembly have also been proposed. The most common solution involves the placement of heating wires or other heating elements onto or embedded in the lighting assembly housing. One such solution is proposed in United States Patent Publication No. 2018/0245767 which discloses a headlight equipped with heating wires, which is implemented such that transparent heating wires are disposed in the plastic of the headlight and the plastic of the headlight is heated through the generation of heat by the heating wires.

Such prior art solutions may be useful for new vehicles where they can be included in the original lighting assembly. However, such solutions are impractical for existing vehicles which do not include an existing solution for removing frost, ice, snow, and moisture from the lighting assemblies. As the heating elements are integral components of the lighting assembly, these solutions require complete replacement of the lighting assembly, which is often an expensive and labor-intensive task.

The need exists, therefore, for an improved solution for removing frost, ice, snow, and moisture from a vehicle lighting assembly which can be retrofit to existing vehicle lighting assemblies.

SUMMARY

Described herein is an apparatus for defrosting a vehicle light. The apparatus may comprise a frame, a heating element, an attachment mechanism, and an electrical communication connection. The frame will have an external facing surface and an internal facing surface. The heating element may be connected to at least a portion of the internal facing surface of the frame. The electrical communication connection may be electrically connected between the heating element and a power source.

The apparatus may be configured to connect to an exterior surface of a vehicle or a vehicle light lens. The attachment mechanism may be selected from the group consisting of at least one mounting bracket, a plurality of protrusions adapted to provide a friction fit with a surface of the vehicle, an adhesive, a fastener, a set screw, and combinations thereof.

In some embodiments, the apparatus may further comprise a temperature sensor. The temperature sensor may be electrically connected to the power source. In certain embodiments, the temperature sensor may be connected to at least a portion of the external facing surface of the frame.

In certain embodiments, the frame may comprise the heating element in the form of a conductive tube type heater. In other embodiments, the heating element may be selected from the group consisting of a ceramic heating element, a resistance wire, a conductive heating strip, and a screen-printed conductive silver plate.

In some embodiments, the frame may comprise at least one cross member. In some such embodiments, the heating element may be connected to at least a portion of at least one of the cross members.

In certain embodiments, the apparatus may be configured to connect to the exterior surface of the vehicle or vehicle light lens such that a gap exists between the internal facing surface of the frame and at least a portion of a vehicle light lens when the apparatus is connected to the vehicle. In some such embodiments, the apparatus may have a gap distance measurement in the range of between 0.1 cm and 12 cm. In other embodiments, the apparatus may be configured to connect to the exterior surface of the vehicle or vehicle light lens such that at least a portion of the internal facing surface of the frame is in direct contact with at least a portion of the vehicle light lens.

DETAILED DESCRIPTION

Disclosed herein is an apparatus for defrosting a vehicle light. The apparatus is described below with reference to the Figures. As described herein and in the claims, the following numbers refer to the following structures as noted in the Figures.

10 refers to an apparatus.

10A refers to a first apparatus.

10B refers to a second apparatus.

50 refers to a vehicle.

52 refers to a vehicle light.

52A refers to a left vehicle headlight.

52B refers to a right vehicle headlight

54 refers to a vehicle light lens.

56 refers to a gap distance measurement.

100 refers to a frame.

101 refers to a first point (on the internal perimeter of the frame).

102 refers to a second point (on the internal perimeter of the frame).

103 refers to a third point (on the internal perimeter of the frame).

104 refers to a fourth point (on the internal perimeter of the frame).

105 refers to a fifth point (on the internal perimeter of the frame).

106 refers to a sixth point (on the internal perimeter of the frame).

107 refers to a seventh point (on the internal perimeter of the frame).

108 refers to an eighth point (on the internal perimeter of the frame).

110 refers to an external facing surface.

120 refers to an internal facing surface.

130 refers to a cross member.

130A refers to a first cross member.

130B refers to a second cross member.

130C refers to a third cross member.

130D refers to a fourth cross member.

200 refers to a heating element.

300 refers to a mounting bracket.

400 refers to an electrical communication connection.

500 refers to a temperature sensor.

Figure 1:
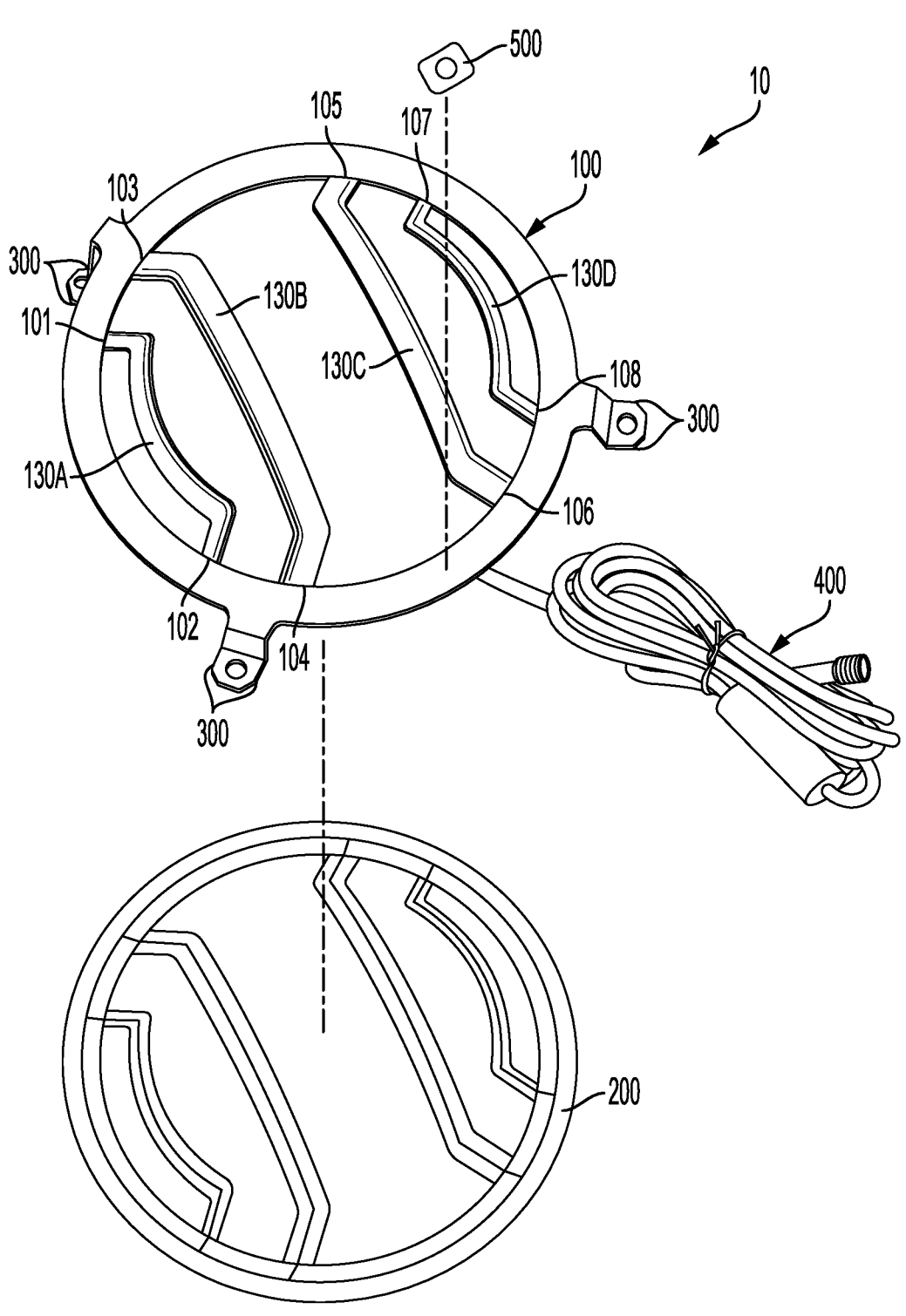
FIG. 1 is an exploded perspective view of one embodiment of an apparatus for defrosting a vehicle light.
Figure 2:
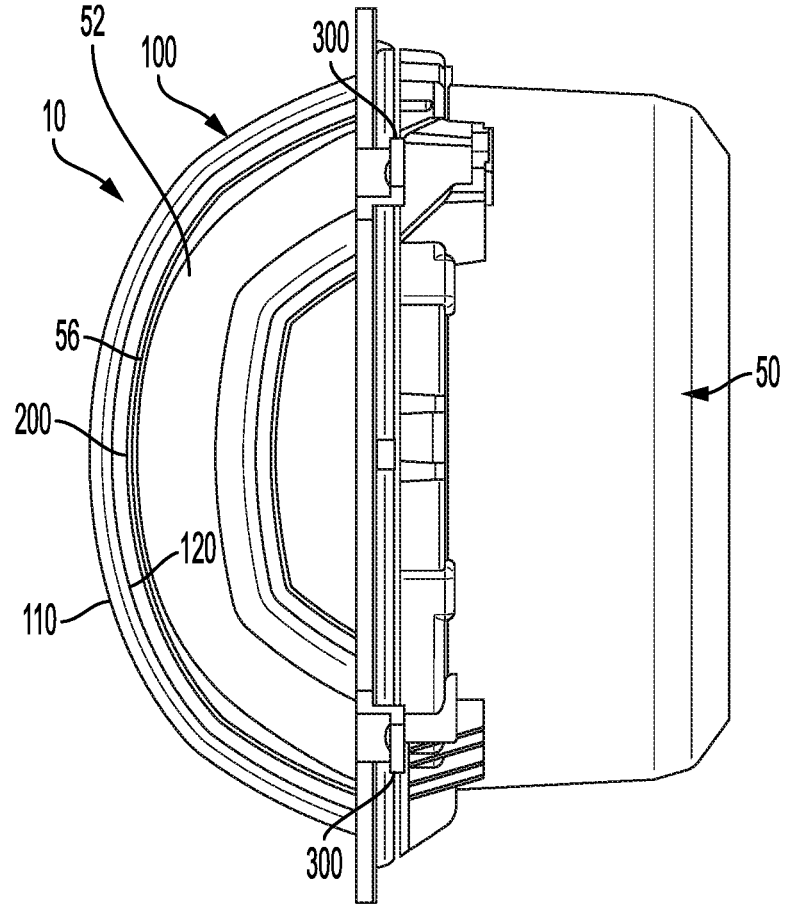
FIG. 2 is an assembled side cross section view of an embodiment of an apparatus for defrosting a vehicle light.

FIG. 1 depicts an exploded perspective view of one embodiment of an apparatus (10) for defrosting a vehicle light ((52) as shown in FIG. 2). As shown in FIG. 1, the apparatus may comprise a frame (100), a heating element (200), at least one mounting bracket (300), and an electrical communication connection (400).

In the embodiment shown in FIG. 1, the frame (100) and the heating element (200) are separate elements connected to one another. The heating element may be connected to an internal facing surface (120) of the frame by any number of different mechanisms including adhesives, fasteners, or by molding the frame around the heating element.

While the embodiment shown in FIG. 1 includes the frame (100) and the heating element (200) as separate elements connected to one another, embodiments may exist in which the frame and the heating element are a single integrated component. That is to say that, in some embodiments, the frame may comprise the heating element. This may be achieved by embedding the heating element in the material of the frame, such as during a casting process. Alternatively, this may be achieved by manufacturing the frame of a material—such as a conductive tube heater material—which is capable of providing radiant heat.

In some embodiments, the apparatus may further comprise a temperature sensor (500), also depicted in FIG. 1. When present, the temperature sensor may be electrically connected to a power source—which may be the vehicle's existing battery or may be a separate power source such as an auxiliary battery. One preferred example of such a temperature sensor is a thermistor. A thermistor is a resistance thermometer, or a resistor whose resistance is dependent on temperature. Certain vehicles are manufactured with an existing temperature sensor (often in the form of an existing thermistor) in which case the vehicle's existing temperature sensor may serve as the temperature sensor for turning the heating element on or off as described herein.

When the temperature sensor determines that temperature conditions exist in which frost, ice, or snow may build up on the vehicle light lens ((54) as shown in FIG. 2), the temperature sensor sends a signal to the vehicle's onboard computer system which in turn sends a signal to the heating element (200) causing the heating element to activate (i.e.— to draw electrical current from a power source and convert that electricity to heat). In some embodiments, the electrical current from the power source may be passed through a relay with the signal from the temperature sensor indicating to the relay when to open and close the circuit between the battery and the heating element. In general, such temperature conditions may include temperatures at the temperature sensor which are at or approaching the freezing point of water (32° F., 0° C.).

FIG. 1 further depicts the frame (100) comprising at least one cross member (130). When present, the cross member(s) may span a distance between any two points on the internal perimeter of the frame. For example, in the embodiment shown in FIG. 1, there are four cross members defined herein as a first cross member (130A), a second cross member (130B), a third cross member (130C), and a fourth cross member (130D). The first cross member spans a distance between a first point (101) on the internal perimeter of the frame and a second point (102) on the internal perimeter of the frame. The second cross member spans a distance between a third point (103) on the internal perimeter of the frame and a fourth point (104) on the internal perimeter of the frame. The third cross member spans a distance between a fifth point (105) on the internal perimeter of the frame and a sixth point (106) on the internal perimeter of the frame. The fourth cross member spans a distance between a seventh point (107) on the internal perimeter of the frame and an eighth point (108) on the internal perimeter of the frame.

The cross member(s) (130), when present, may be connected to the frame (100) by a number of mechanisms. In some embodiments the cross member(s) may be integrally connected to the frame such as by manufacturing the cross member(s) and the frame of a single integral piece of material, or by welding the cross member(s) to the frame. In other embodiments the cross member(s) may be connected to the frame by a fastener such as a screw, a nut, a bolt, a rivet, a clamp, or the like.

In some embodiment where cross member(s) (130) are present, a portion of the heating element (200) may be connected to at least a portion of at least one of the cross member(s). The heating element may be connected to an internal facing surface of the cross member(s) by a number of mechanisms including adhesives, fasteners, or by molding the cross member(s) around the heating element.

While the Figures show the cross member(s) (130) and the heating element (200) connected to one another, embodiments may exist in which the cross member(s) and the heating element are a single integrated component. That is to say that, in some embodiments, the cross member(s) may comprise the heating element. This may be achieved by embedding the heating element into the material of the cross member(s), such as during a casting process. Alternatively, this may be achieved by manufacturing the cross member(s) of a material—such as conductive tube heater material— which is capable of providing radiant heat.

FIG. 2 depicts an assembled side cross section view of one embodiment of an apparatus (10) for defrosting a vehicle light (52). As shown in FIG. 2, the frame (100) of the apparatus will have an external facing surface (110) and an internal facing surface (120). The external and internal facing surfaces refer to the orientation of the frame surfaces relative to the vehicle light. As shown in FIG. 2, once the apparatus has been installed on a vehicle, the external facing surface is oriented in a direction facing away from the vehicle light while the internal facing surface is oriented in a direction facing towards the vehicle light.

Once assembled, the heating element (200) may be connected to at least a portion of the internal facing surface (120) of the frame (100). The heating element may be connected to the internal facing surface of the frame by a number of mechanisms including adhesives, fasteners, or by molding the frame around the heating element. In some embodiments, the heating element may be connected to only a portion of the internal facing surface while in other embodiments the heating element may be connected to substantially all or all of the internal facing surface. Accordingly, it may be said that, when the heating element is connected to the internal facing surface, the heating element covers at least a portion of the surface area of the internal facing surface of the frame. The portion of the surface area of the internal facing surface of the frame which may be covered by the heating element may be in a range selected from the group consisting of between 35% and 100% of the surface area of the internal surface, between 35% and 95% of the surface area of the internal surface, between 35% and 75% of the surface area of the internal surface, between 35% and 50% of the surface area of the internal surface, between 50% and 100% of the surface area of the internal surface, between 50% and 95% of the surface area of the internal surface, between 50% and 75% of the surface area of the internal surface, between 75% and 100% of the surface area of the internal surface, between 75% and 95% of the surface area of the internal surface, and between 95% and 100% of the surface area of the internal surface.

FIG. 2 also shows the at least one mounting bracket (300). As shown in FIG. 2, the at least one mounting bracket is configured to connect between the frame (100) and an exterior surface of a vehicle (50) and/or vehicle light lens (54). The connection between the at least one mounting bracket and the frame may be an integral connection, such as by manufacturing the at least one mounting bracket and the frame as a single integral piece of material or by welding the at least one mounting bracket to the frame. Alternatively, the connection between the at least one mounting bracket and the frame may be a fastened connection in which the at least one mounting bracket is connected to the frame by a fastener such as a screw, bolt, rivet, clamp, or the like. In general, the connection between the at least one mounting bracket and the exterior surface of the vehicle and/or vehicle light lens will be a fastened connection in which the at least one mounting bracket is connected to the exterior surface of the vehicle and/or vehicle light lens by a fastener such as a screw, bolt, rivet, clamp, or the like.

While the examples shown in the Figures include at least one mounting bracket (300), embodiments may exist which do not include a mounting bracket. In such embodiments, the apparatus (10) may include an alternative attachment mechanism which allows the apparatus to be installed on the surface of a vehicle. Alternative attachment mechanisms include—but are not limited to—a plurality of protrusions adapted to provide a friction fit between the frame and a surface of the vehicle, an adhesive applied between a surface of the frame and an external surface of the vehicle, a fastener—such as a screw, a bolt, a rivet, or a clamp— connecting between a surface of the frame and an external surface of the vehicle, a set screw, and combinations thereof.

In some embodiments, once the apparatus (10) is connected to the vehicle, at least a portion of the internal facing surface (120) of the frame (100) and/or the heating element (200) may be in direct contact with at least a portion of the vehicle light lens (54). In other embodiments, once the apparatus is connected to the vehicle, a gap may exist between the internal facing surface of the frame and at least a portion of the vehicle light lens. When present, this gap will have a gap distance measurement (56). As shown in FIG. 2, the gap distance measurement is the minimum distance between a surface of the vehicle light lens and the internal facing surface of the frame. This gap distance measurement may be in a range selected from the group consisting of between 0.1 cm and 12 cm, between 0.1 cm and 10 cm, between 0.1 cm and 5 cm, between 1 cm and 12 cm, between 1 cm and 10 cm, and between 1 cm and 12 cm.

Figure 3:
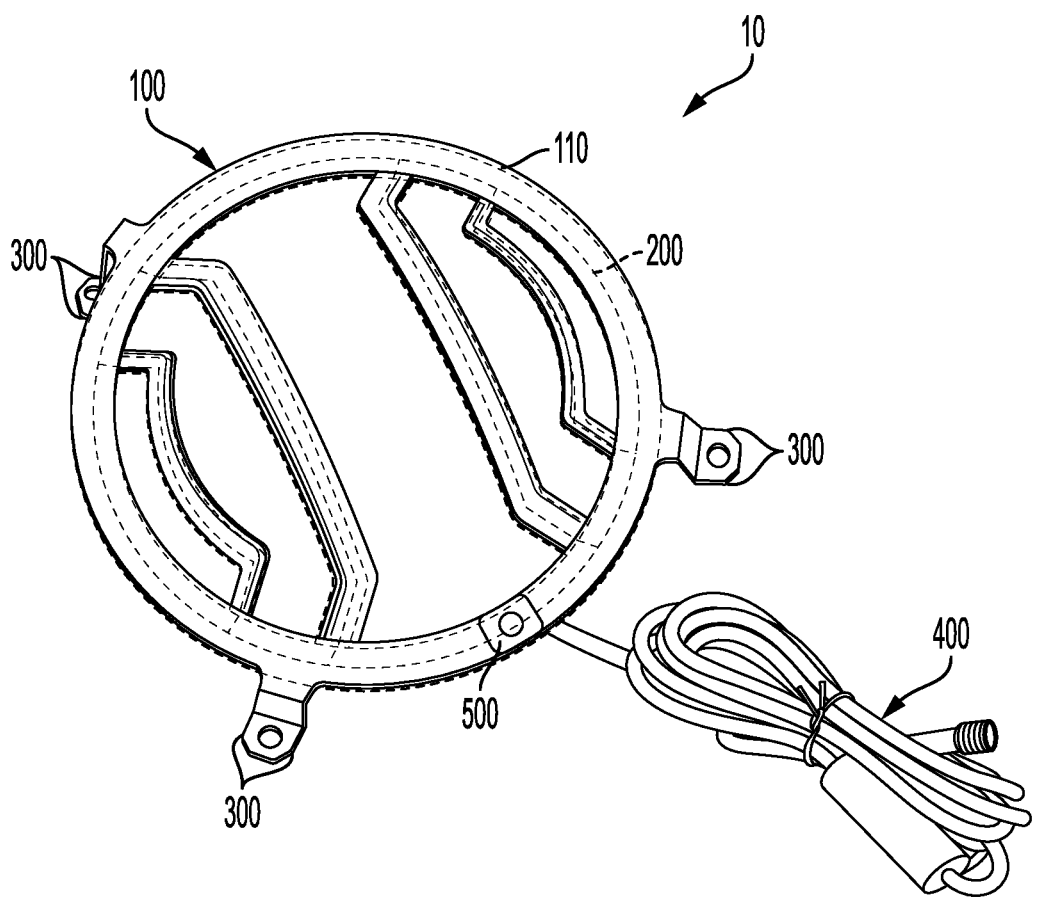
FIG. 3 is an assembled perspective view of the apparatus of FIG. 1.

FIG. 3 depicts an assembled perspective view of one embodiment of the apparatus. As shown in FIG. 3, the optional temperature sensor (500) may be connected to at least a portion of the external facing surface (110) of the frame (100). The temperature sensor may be connected to the external facing surface of the frame by a number of mechanisms including adhesives, fasteners, or by molding the frame around the temperature sensor. While FIG. 3 shows the temperature sensor connected to at least a portion of the external facing surface of the frame, one of ordinary skill will recognize that other configurations may exist in which the temperature sensor is connected to other surfaces of the frame—such as the internal facing surface (120 as shown in FIG. 2)—or to the mounting bracket(s) (300). Alternatively, the temperature sensor may be connected external to the frame, such as within the electrical communication connection (400), or at a separate location on the vehicle (such as the vehicles grill) with the temperature sensor electrically connected to the electrical communication connection via a separate wire. When used and when connected to the internal facing surface of the frame, the temperature sensor is preferably connected to a portion of the internal facing surface of the frame which is not connected to the heating element (200).

Figure 4:
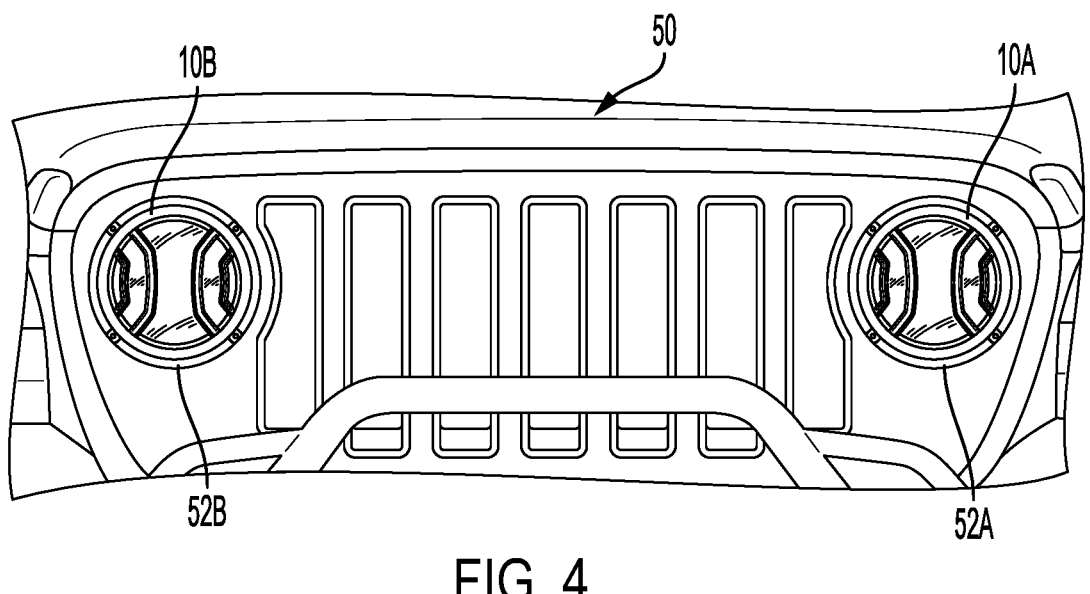
FIG. 4 is a perspective view of an embodiment of an apparatus for defrosting a vehicle light installed on a vehicle.

FIG. 4 depicts an embodiment of the apparatus attached to the two headlights of a vehicle (50) with the vehicle's front bumper, grill, headlights, and a portion of the vehicle's hood illustrated. As shown in FIG. 4, a first apparatus (10A) may be connected to the vehicle at the vehicle's left headlight (52A), while a second apparatus (10B) may be connected to the vehicle at the vehicle's right headlight (52B). While FIG. 4 shows the apparatus attached only to the headlights of the vehicle, other embodiments may exist in which different combinations of the vehicles headlight(s), turn signal light(s), daytime running light(s), high beam light(s), tail light(s) and marker light(s) have an embodiment of the apparatus connected thereto.

Figure 5A:
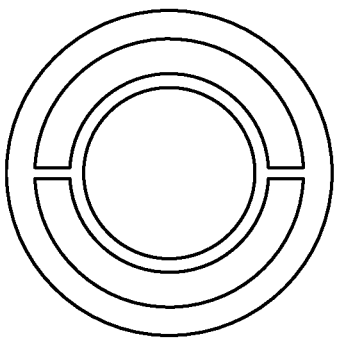
FIG. 5A is a front view of one embodiment of cross members in an apparatus for defrosting a vehicle light.
Figure 5B:
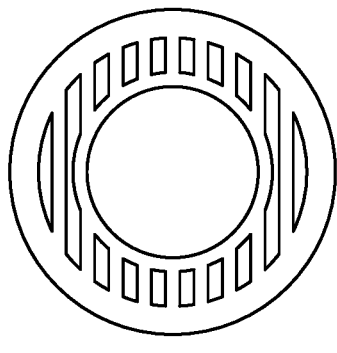
FIG. 5B is a front view of another embodiment of cross members in an apparatus for defrosting a vehicle light.
Figure 5C:
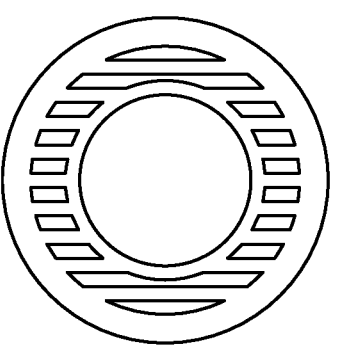
FIG. 5C is a front view of another embodiment of cross members in an apparatus for defrosting a vehicle light.
Figure 5D:
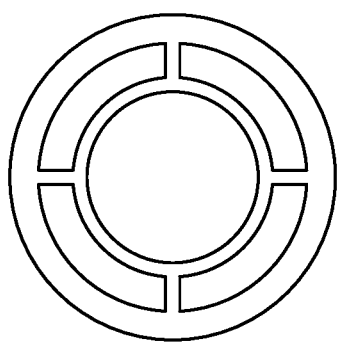
FIG. 5D is a front view of another embodiment of cross members in an apparatus for defrosting a vehicle light.
Figure 5E:
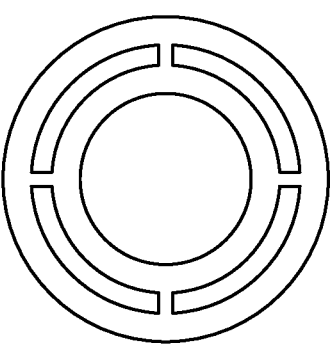
FIG. 5E is a front view of another embodiment of cross members in an apparatus for defrosting a vehicle light.
Figure 5F:
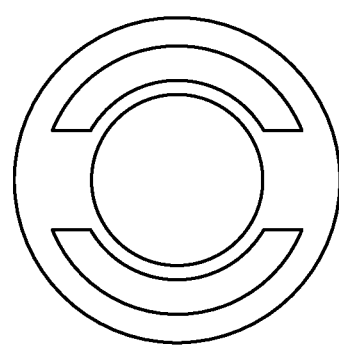
FIG. 5F is a front view of another embodiment of cross members in an apparatus for defrosting a vehicle light.
Figure 5G:
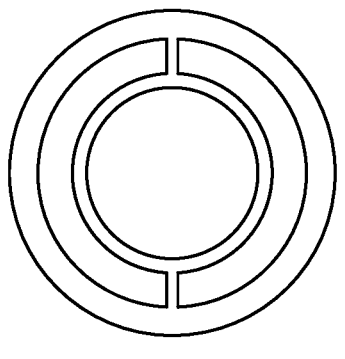
FIG. 5G is a front view of another embodiment of cross members in an apparatus for defrosting a vehicle light.
Figure 5H:
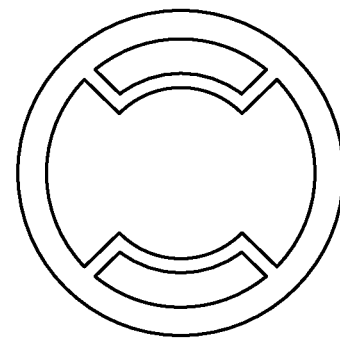
FIG. 5H is a front view of another embodiment of cross members in an apparatus for defrosting a vehicle light.
Figure 5I:
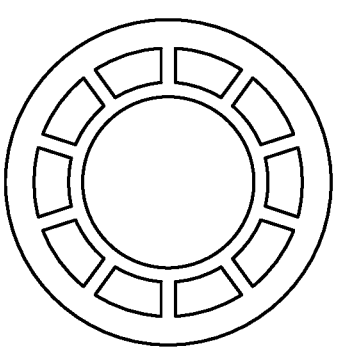
FIG. 5I is a front view of another embodiment of cross members in an apparatus for defrosting a vehicle light.
Figure 5J:
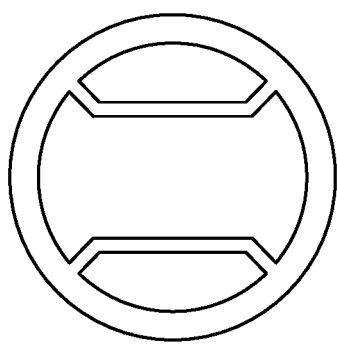
FIG. 5J is a front view of another embodiment of cross members in an apparatus for defrosting a vehicle light.
Figure 5K:
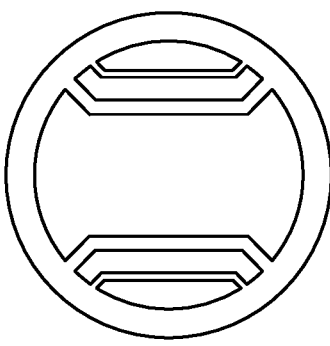
FIG. 5K is a front view of another embodiment of cross members in an apparatus for defrosting a vehicle light.
Figure 5L:
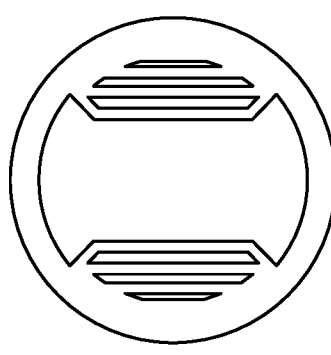
FIG. 5L is a front view of another embodiment of cross members in an apparatus for defrosting a vehicle light.
Figure 5M:
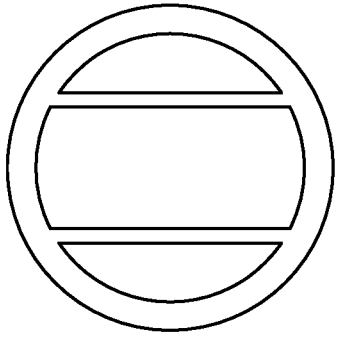
FIG. 5M is a front view of another embodiment of cross members in an apparatus for defrosting a vehicle light.
Figure 5N:
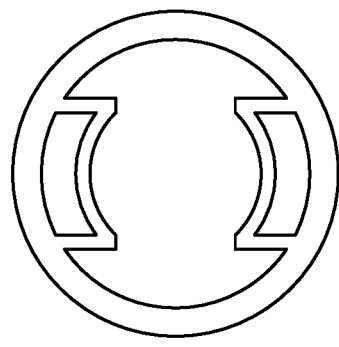
FIG. 5N is a front view of another embodiment of cross members in an apparatus for defrosting a vehicle light.
Figure 5O:
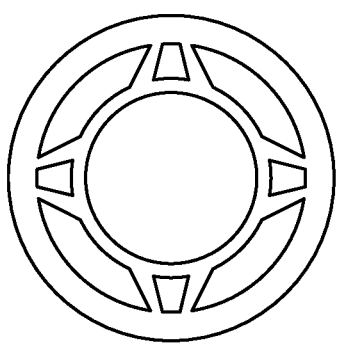
FIG. 5O is a front view of another embodiment of cross members in an apparatus for defrosting a vehicle light.

FIG. 5A through FIG. 5O depict front views of various embodiments of cross member(s) connected to various points of the internal perimeter of the frame. In some embodiments, such as those shown in FIG. 5A through 5G, FIG. 5I, and FIG. 5O, the apparatus may comprise a pair of cross members which extend from the internal perimeter of the frame and terminate into a circular frame member.

In the apparatus described herein, the heating element may come in a number of forms. One preferred heating element is a ceramic heating element. Other heating elements may include a resistance wire, a conductive heating strip, and a screen-printed conductive silver paste.

In some embodiments, the apparatus may further include a switch. When used, the switch may be located within the vehicle's interior to allow a user to manually turn on and off the heating element. When used, the switch allows the vehicle operator to activate the heating element by turning the switch to a switch on position in which a circuit between the vehicle's power system and the heating element is closed. When the circuit is closed, the heating element draws power from the vehicle's power system (i.e.—the vehicle's existing battery or an auxiliary battery) through a wiring connection and converts the electrical current to heat which is generated in the direction of the vehicle's light. In some embodiments, the electrical current from the power source may be passed through a relay with the signal from the temperature sensor indicating to the relay when to open and close the circuit between the power source and the heating element. The heat generated by the heating element then serves to melt any ice, snow, or frost on top of or inside the vehicle light lens. The vehicle operator may then deactivate the heating element by turning the switch to a switch off position in which the circuit between the vehicle's power system and the heating element is opened. In some embodiments, instead of or in addition to the switch, the circuit may also be closed and opened via an electrical communication connection with the temperature sensor as described herein.

The apparatus disclosed herein allows a vehicle operator to remotely melt any ice, snow, or frost on top of or inside the vehicle light lens by turning the heating element on or off as described herein. Ice, snow, or frost on top of or inside the vehicle light lens can also be melted automatically—i.e., without the need for a user input—by way of the optional temperature sensor which activates the heating element when temperature conditions indicative of ice, snow, or frost are detected at the temperature sensor.

The apparatus disclosed herein also has the advantage of being easy to retrofit to an existing vehicle without the need to replace the entire vehicle light assembly. The apparatus may simply be attached to an external surface of the vehicle and/or vehicle light lens via the mounting bracket(s). The electrical communication connection may then be routed to the vehicle's power system and/or onboard computer system to allow the heating element to be turned on or off as described herein.

What is claimed is:

1. An apparatus (10) for defrosting a vehicle light (52) comprising:
    a frame (100) having an external facing surface (110) and an internal facing surface (120),
    a heating element (200) connected to at least a portion of the internal facing surface, an attachment mechanism, and
    an electrical communication connection (400) electrically connected between the heating element and a power source;
    wherein the attachment mechanism is selected from the group consisting of at least one mounting bracket (300), a plurality of protrusions adapted to provide a friction fit with a surface of the vehicle (50), an adhesive, a fastener, a set screw, and combinations thereof; and wherein the apparatus is configured to connect to an exterior surface of a vehicle or a vehicle light lens (54);
    wherein the apparatus is configured to connect to the exterior surface of the vehicle or vehicle light lens such that a gap exists between the internal facing surface of the frame and at least a portion of the vehicle light lens when the apparatus is connected to the vehicle; and
    wherein the gap has a gap distance measurement (56) in the range of between 0.1 cm and 12 cm.

2. The apparatus of claim 1, further comprising a temperature sensor (500) electrically connected to the power source.

3. The apparatus of claim 2, wherein the temperature sensor is connected to at least a portion of the external facing surface.

4. The apparatus of claim 1, wherein the frame comprises the heating element.

5. The apparatus of claim 4, wherein the heating element is a conductive tube type heater.

6. The apparatus of claim 1, wherein the heating element is selected from the group consisting of a ceramic heating element, a resistance wire, a conductive heating strip, and a screen-printed conductive silver paste.

7. The apparatus of claim 1, further comprising a switch electrically connected to the electrical communication connection.

8. The apparatus of claim 1, wherein the frame comprises at least one cross member (130).

9. The apparatus of claim 8, wherein the heating element is connected to at least a portion of at least one of the cross members.

10. An apparatus (10) for defrosting a vehicle light (52) comprising:
    a frame (100) having an external facing surface (110) and an internal facing surface (120),
    a heating element (200) connected to at least a portion of the internal facing surface,
    an attachment mechanism, and
    an electrical communication connection (400) electrically connected between the heating element and a power source;
    wherein the attachment mechanism is selected from the group consisting of at least one mounting bracket (300), a plurality of protrusions adapted to provide a friction fit with a surface of the vehicle (50), an adhesive, a fastener, a set screw, and combinations thereof; and wherein the apparatus is configured to connect to an exterior surface of a vehicle or a vehicle light lens (54); and
    wherein the apparatus is configured to connect to the exterior surface of the vehicle or vehicle light lens such that at least a portion of the internal facing surface of the frame is in direct contact with at least a portion of the vehicle light lens.

11. The apparatus of claim 10, further comprising a temperature sensor (500) electrically connected to the power source.

12. The apparatus of claim 11, wherein the temperature sensor is connected to at least a portion of the external facing surface.

13. The apparatus of claim 10, wherein the frame comprises the heating element.

14. The apparatus of claim 13, wherein the heating element is a conductive tube type heater.

15. The apparatus of claim 10, wherein the heating element is selected from the group consisting of a ceramic heating element, a resistance wire, a conductive heating strip, and a screen-printed conductive silver paste.

16. The apparatus of claim 10, further comprising a switch electrically connected to the electrical communication connection.

17. The apparatus of claim 10, wherein the frame comprises at least one cross member (130).

18. The apparatus of claim 17, wherein the heating element is connected to at least a portion of at least one of the cross members.

19. The apparatus of claim 10, wherein the apparatus is configured to connect to the exterior surface of the vehicle or vehicle light lens such that a gap exists between the internal facing surface of the frame and at least a portion of the vehicle light lens when the apparatus is connected to the vehicle.

\* \* \* \* \*